(12) United States Patent
Pailler et al.

(10) Patent No.: US 10,017,193 B2
(45) Date of Patent: Jul. 10, 2018

(54) COMFORT DEVICE, IN PARTICULAR FOR A RAILWAY VEHICLE, COMPRISING A PERFECTED REMOVABLE TABLE

(71) Applicant: ALSTOM TRANSPORT TECHNOLOGIES, Saint-Ouen (FR)

(72) Inventors: Christophe Pailler, Salles sur Mer (FR); Francis Langlois, Faumont (FR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 0 days.

(21) Appl. No.: 15/264,157

(22) Filed: Sep. 13, 2016

(65) Prior Publication Data
US 2017/0080954 A1 Mar. 23, 2017

(30) Foreign Application Priority Data

Sep. 17, 2015 (FR) ...................................... 15 58730

(51) Int. Cl.
*A47B 5/00* (2006.01)
*B61D 37/00* (2006.01)
(Continued)

(52) U.S. Cl.
CPC ................ *B61D 37/00* (2013.01); *A47B 5/02* (2013.01); *A47B 5/04* (2013.01); *A47B 5/06* (2013.01); *B60N 3/001* (2013.01)

(58) Field of Classification Search
CPC .. F16M 13/00; A47B 5/02; A47B 5/04; A47B 5/06; B61D 37/00; B60N 3/001
(Continued)

(56) References Cited

U.S. PATENT DOCUMENTS 1,790,977 A * 2/1931 Boer .......................... B60R 7/04
224/278
2,457,373 A * 12/1948 Hunter ...................... A47B 5/02
248/244
(Continued)

FOREIGN PATENT DOCUMENTS

DE 4026391 * 2/1992
DE 298 08 822 U1 7/1998
(Continued)

OTHER PUBLICATIONS

French Search Report, dated Jun. 2, 2016, from corresponding French Application.

*Primary Examiner* — Janet M Wilkens
(74) *Attorney, Agent, or Firm* — Young & Thompson (57) ABSTRACT

The comfort device (10) includes a table (12) including a plate (22) and attachment unit (14, 16) including: a lateral fixed support (46), attached to a vertical wall (20), including a first connecting portion by sliding, an attachment member (52) secured to the plate (22), including a second connecting portion by sliding, mating the first, and unit retractable unit for blocking the attachment member on the lateral fixed support, active at the end of a predefined travel of the first connecting portion on the second connecting portion. These blocking units are movable between a blocking position in which the first and second connecting portions are secured to each other, and a release position in which the first and second connecting portions are free to move relatively to each other.

19 Claims, 5 Drawing Sheets

(51) Int. Cl.
*A47B 5/04* (2006.01)
*A47B 5/06* (2006.01)
*A47B 5/02* (2006.01)
*B60N 3/00* (2006.01)

(58) Field of Classification Search
USPC ...... 248/200, 235, 222.13; 312/245; 108/42, 108/44, 48, 137, 143
See application file for complete search history.

(56) References Cited

U.S. PATENT DOCUMENTS

| | | | | | |
|---|---|---|---|---|---|
| 2,509,332 | A * | 5/1950 | Budd | ............... | A47B 5/00 108/142 |
| 2,636,892 | A * | 4/1953 | Mayer | ............... | B22F 9/22 252/62.55 |
| 2,814,892 | A * | 12/1957 | Larsen | ............... | D06F 81/06 108/135 |
| 2,897,928 | A * | 8/1959 | Selig | ............... | G03B 15/041 248/222.13 |
| 2,955,893 | A * | 10/1960 | Dorval | ............... | A47K 1/09 248/311.2 |
| 3,146,739 | A * | 9/1964 | Furman | ............... | A47B 63/00 109/52 |
| 3,337,172 | A * | 8/1967 | Jackson | ............... | A47B 96/068 248/222.51 |
| 3,427,667 | A * | 2/1969 | Ratcliff | ............... | A47B 5/00 5/3 |
| 3,436,138 | A * | 4/1969 | Ressler | ............... | A47B 95/008 312/242 |
| 3,733,043 | A * | 5/1973 | Binns | ............... | A47G 25/0678 211/86.01 |
| 4,130,070 | A * | 12/1978 | Herrin | ............... | A47B 13/081 108/143 |
| 4,930,694 | A * | 6/1990 | Yoshitake | ............... | B60P 7/13 224/547 |
| 4,936,533 | A * | 6/1990 | Adams | ............... | B60R 1/04 248/222.11 |
| 4,993,785 | A * | 2/1991 | Dunand | ............... | B42D 5/005 248/224.61 |
| 5,037,232 | A | 8/1991 | Pakdipanichpong | | |
| 5,226,625 | A * | 7/1993 | Hanna | ............... | A47K 5/12 248/222.13 |
| 6,588,717 | B2 * | 7/2003 | Carnahan | ............... | B63B 29/06 248/188.1 |
| 7,077,372 | B2 * | 7/2006 | Moran | ............... | A61B 19/54 24/573.11 |
| 7,175,152 | B2 * | 2/2007 | Dittmer | ............... | F16M 11/041 248/221.11 |
| 7,261,264 | B2 * | 8/2007 | Moran | ............... | A01K 1/0356 24/573.11 |
| 2006/0016372 | A1 * | 1/2006 | Younse | ............... | A47B 1/08 108/44 |
| 2009/0249982 | A1 * | 10/2009 | Palethorpe | ............... | A47B 5/00 108/44 |
| 2015/0366337 | A1 * | 12/2015 | Luebke | ............... | A47B 13/081 108/44 |
| 2016/0037906 | A1 * | 2/2016 | Knight | ............... | A47B 5/04 108/42 |
| 2017/0066456 | A1 * | 3/2017 | Pailler | ............... | B61D 37/00 |

FOREIGN PATENT DOCUMENTS

DE 29820585 * 12/1999
EP 1 288 096 A1 3/2003

* cited by examiner

COMFORT DEVICE, IN PARTICULAR FOR A RAILWAY VEHICLE, COMPRISING A PERFECTED REMOVABLE TABLE

BACKGROUND OF THE INVENTION

Field of the Invention

The present invention relates to a comfort device, notably intended to equip a public transportation vehicle, and more particularly a railway vehicle, of the type including a table and removable attachment means of this table to a structural portion of a compartment.

Description of the Related Art

In certain cases, it is sometimes necessary to reorganize the arrangement of the seats and of the tables in a compartment of a railway vehicle, for example in order to adapt this arrangement to the circulation direction of this railway vehicle.

In this case, it is necessary to disassemble, displace, and then reassemble the tables, such operations generally being tedious.

SUMMARY OF THE INVENTION

The object of the invention is notably to find a remedy to this drawback, by proposing a device allowing easy, rapid and ergonomic assembling and disassembling of the table.

For this purpose, the object of the invention is notably a comfort device, notably for passengers of a railway vehicle, including a table comprising a plate and means for attaching the table to a structural portion of a compartment, characterized in that the attachment means include:
  a lateral fixed support, intended to be attached to a vertical wall of the structural portion of the compartment, comprising a first connecting portion by sliding,
  an attachment member secured to the plate of the table, comprising a second connecting portion by sliding, complementary to the first, and
  retractable means for blocking the attachment member on the lateral fixed support, active when the attachment member is added onto the lateral fixed support at the end of a predefined travel of the first connecting portion with respect to the second connecting portion, these blocking means being movable between a blocking position in which the first and second connecting portions are secured to each other, and a release position in which the first and second connecting portions are free to move relatively to each other.

The table may be easily disassembled by simply deactivating the blocking means for detaching the attachment member from the fixed lateral support.

The mounting of the table is accomplished conversely by bringing the attachment member on the fixed lateral support by having the first and second connecting portions by sliding cooperate with each other, and then by activating the blocking means.

A comfort device according to the invention may further include one or several of the following features, taken alone or according to all the technically conceivable combinations.
  One of the first and second connecting portions by sliding is formed by a rail, extending in a vertical direction, having a trapezoidal section in a horizontal plane, and the other one of the first and second connecting portions is formed with an elongated housing mating said rail, in which the rail is able to slide in a vertical direction.

The rail extends in the vertical direction between a first end, intended to be presented first during the insertion of the rail into the housing, as far as a second end, and has a width, in a transverse direction perpendicular to the vertical direction, which increases from the first end as far as the second end, and the housing extends in the vertical direction from a lower mouth, and has a width, in the transverse direction, which decreases from this lower mouth.

The table comprises a central leg secured to the plate, the attachment means including a fixed support on the floor, intended to be attached to a floor wall of the structural portion of the compartment, intended to be connected to the central leg of the table, and comprising means for maintaining this central leg.

The fixed support on the floor includes a vertically protruding shape, having a peripheral edge, comprising an upper rim extending from a portion of the peripheral edge, and the table leg includes a hollow lower area having an inner edge with a shape mating that of the peripheral edge, and having an inner abutment extending inwards, said inner abutment being intended to be inserted under the upper rim, this inner abutment thus being intended to cooperate with the upper rim for limiting vertical upward movement of the table leg.

The upper rim extends horizontally from the peripheral edge while moving away from the lateral fixed support.

The blocking means include: at least one male element borne by one of the attachment member and the lateral fixed support, movable between a deployed position and a retracted position, and at least one first elastic return member of the male element towards its deployed position, at least one fixed female element, mating the male element, borne by the other one from among the attachment member and the lateral fixed support, each male element being found facing the corresponding female element when the attachment member is added onto the lateral fixed support at the end of the predefined travel of the first connecting portion relatively to the second connecting portion.

The male element is able to cooperate with said other one from among the attachment member and the lateral fixed support, so as to be pushed towards its retracted position as long as the first and second connecting portions cooperate with each other without being at the end of their travel.

The comfort device includes means for moving the male element towards its retracted position, actuatable by an operator, for example by means of an added element such as a key.

Each male element is formed by a hook borne by a rotating axis.

The comfort device includes a second elastic member laid out between the attachment member and the lateral fixed support, applying a separating force between the attachment member and the lateral fixed support in the vertical direction.

Each male element extends above its rotating axis in a vertical direction, and includes an elongated body connected to the rotating axis, and an extension extending and protruding from the body, the extension being intended to cooperate with the corresponding female element, and the body being tilted relatively to the vertical direction, towards the female element.

BRIEF DESCRIPTION OF THE DRAWINGS

The invention will be better understood upon reading the description which follows, only given as an example and made with reference to the appended figures wherein.

DESCRIPTION OF THE PREFERED EMBODIMENTS

Figure 1:
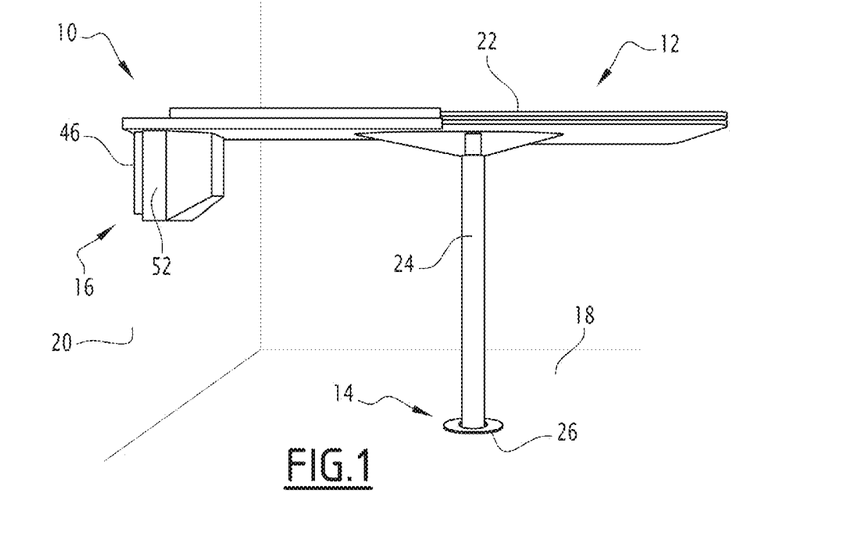
FIG. 1 is a profile view of the comfort device according to a first exemplary embodiment of the invention.

In FIG. 1, a comfort device 10 is illustrated, notably intended for equipping a public transportation vehicle, and more particularly a railway vehicle. This comfort device 10 is intended to be laid out in a compartment notably a passenger compartment of a railway vehicle, such a compartment including a structural portion comprising a floor wall 18 and at least one lateral wall 20.

In the present description, a «horizontal plane» is defined as being parallel to the floor 18, a «horizontal direction» as being included in a horizontal plane, and a «vertical direction» as being perpendicular to a horizontal plane.

The comfort device 10 includes a table 12, as well as first 14 and second 16 means for attaching this table 12 to the structural portion of the compartment, and more particularly to the floor wall 18 and to the lateral wall 20.

The table 12 conventionally comprises a plate 22 and a central leg 24 bound to the plate 22, for example secured to this plate 22.

The first attachment means 14 include a fixed support on the floor 26, intended to be attached to the floor wall 18, and intended to be removably connected to the central leg 24 of the table 12. For this purpose, the fixed support on the ground 26 comprises means 28 for maintaining the central leg 24, illustrated in more detail in FIGS. 2 and 3.

Figure 2:
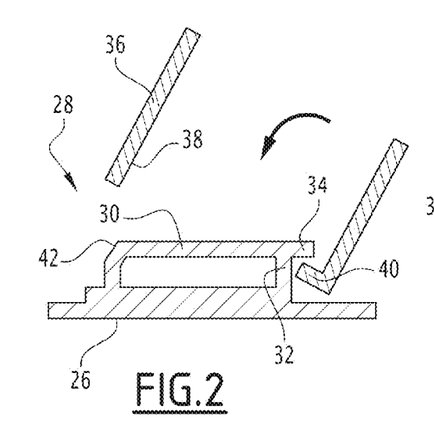
FIGS. 2 and 3 are schematic sectional views illustrating the connection between a central leg of the table and a fixed support on the ground of the device of FIG. 1, respectively during assembling and assembled.
Figure 3:
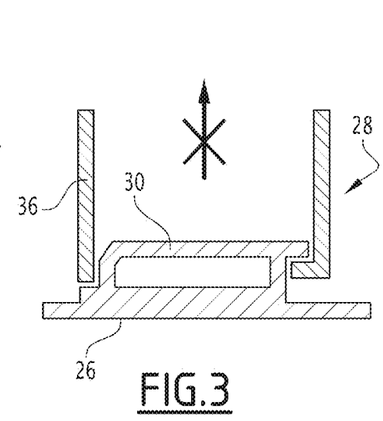

As this is illustrated in FIGS. 2 and 3, the support fixed to the floor 26 includes a vertically protruding shape 30, having a peripheral edge 32 comprising an upper rim 34 extending from a portion of this peripheral edge 32. The upper rim 34 extends horizontally from the peripheral edge 32 by moving away from the lateral wall 20.

The central leg 24 as for it includes a hollow lower area 36 having an inner edge 38 with a shape mating that of the peripheral edge 32. Thus, when the inner edge 38 cooperates with the peripheral edge 32 by surrounding the latter, the central leg 24 is immobilized in translation in any horizontal direction.

The hollow lower area 36 moreover has an abutment 40 protruding towards the inside of this lower area 36.

The inner abutment 40 is intended to be inserted under the upper rim 34, this inner abutment 40 being intended to cooperate with this upper rim 34 in order to limit vertical displacement upwards of the table leg 24. Advantageously, play subsists between the inner abutment 40 and the upper rim 34, in order to allow slight vertical displacement of the table 10 when the second attachment means 16 are not active.

Advantageously, the peripheral edge 32 has a chamfer 42, opposite to the upper rim 34.

The assembling of the leg of the table 24 with the fixed support on the floor 26 is first of all achieved by bringing the lower area 36 in a tilted way in order to insert the inner abutment 40 under the upper rim 34, as this is illustrated in FIG. 2. Next, the table leg 24 is tilted so as to assume a vertical position, as this is illustrated in FIG. 3. It will be noted that the chamfer 42 gives the possibility of avoiding that the peripheral edge 32 forms an abutment opposed to the tilting of the table leg 24 towards its vertical position.

In this vertical position, the inner edge 38 cooperates with the peripheral edge 32, so that the table leg 24 is immobilized in translation along any horizontal direction. Moreover, because of the cooperation of the inner abutment 40 with the upper rim 34, the displacement of the table leg 24 in vertical translation is limited.

The detachment of the table leg 24 from the fixed support on the floor 26 is only possible by tilting the hollow lower area 36, in a movement which is the reverse of the one having been used upon assembling.

Figure 4:
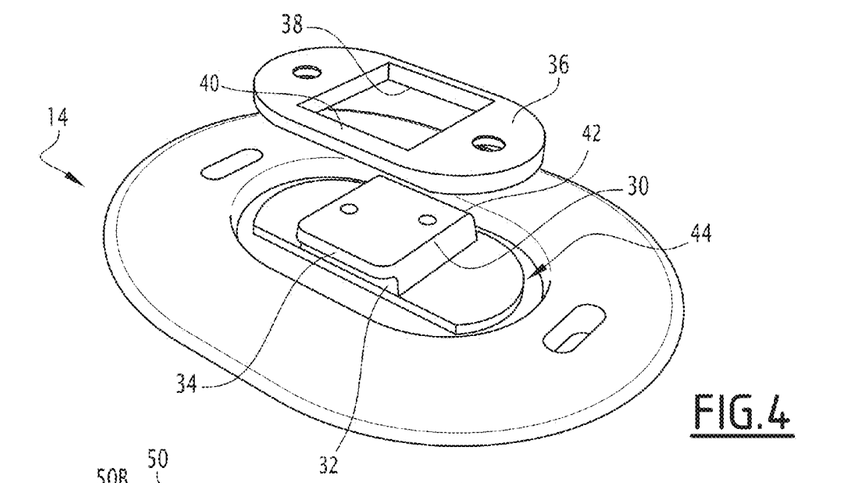
FIG. 4 is a perspective view of the fixed support on the floor and of an assembling element borne by the table leg.

A first example of first attachment means 14 is illustrated in FIG. 4. In this figure, the elements similar to those of the preceding figures are designated with identical references.

According to this alternative, the hollow lower area 36 is formed with a platelet comprising a through-orifice delimited by the inner edge 38. The platelet 36 is intended to be attached to a lower end of the table leg 24.

The protruding shape 30 is preferably laid out in a recess 44 so as not to jut out, or only jut out slightly from the surface of the floor 18. Indeed it is preferable that the height of the fixed support on the floor 14 with respect to the floor 18 be limited so as not to be a bother when the table 12 is disassembled.

The second attachment means 16 are illustrated in more details in FIGS. 5 to 8.

Figures 5, 6, 7, 8:
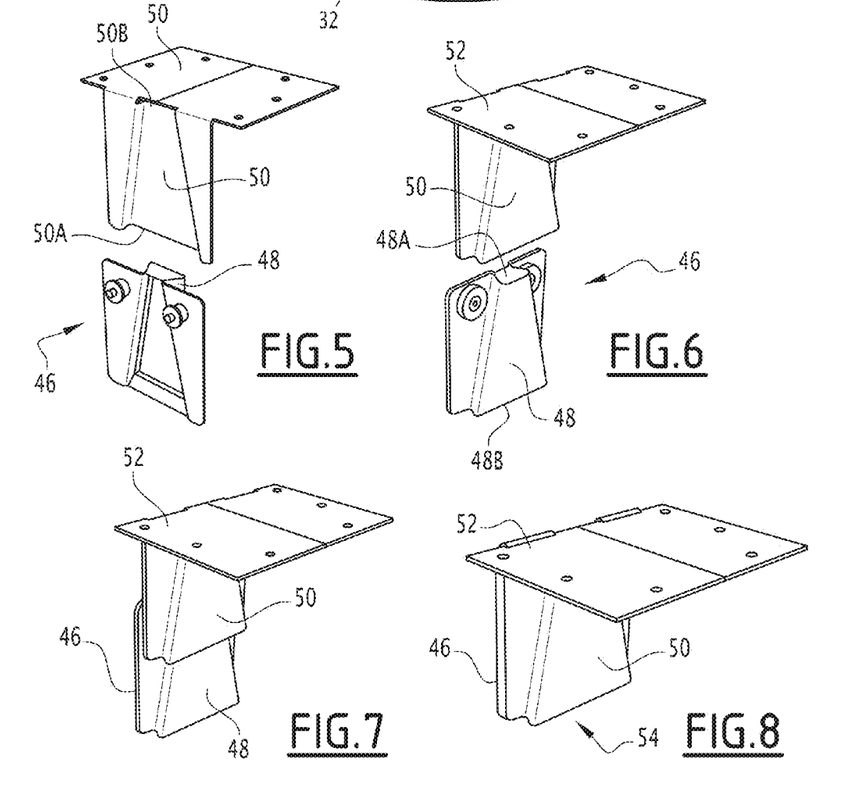
FIGS. 5 and 6 are perspective views of a lateral fixed support and of a member for attaching the device of FIG. 1, respectively according to two opposite viewing angles.
FIGS. 7 and 8 are views similar to FIG. 6 illustrating the attachment member and the lateral fixed support, respectively during assembling and assembled.

The second attachment means 16 include a lateral fixed support 46 intended to be attached to the vertical wall 20 of the compartment, in proximity to the fixed support on the ground 26, so that the table 12 may be both attached to the fixed support on the floor 26 and to the lateral fixed support 46.

The lateral fixed support 46 includes a first connecting portion by sliding 48, mating a second connecting portion by sliding 50, which is borne by an attachment member 52 intended to be secured to the plate 22 of the table 12. The sliding connection is oriented vertically.

The first 48 and second 50 connecting portions by sliding for example form a dovetail connection.

The first connecting portion 48 is formed by a rail, extending in a vertical direction, and having a trapezoidal section in a horizontal plane.

The second connecting portion 50 is formed by a housing mating the rail 48, elongated in the vertical direction, wherein the rail 48 is able to slide vertically.

Alternatively, the first connecting portion may conversely be formed by an elongated housing and the second connecting portion by a mating rail.

The rail 48 extends in the vertical direction between a first end 48A, intended to be presented first upon inserting the rail 48 into the housing 50, as far as a second end 48B. The rail 48 preferably has a width, in a traverse direction perpendicular to the vertical direction and parallel to the lateral wall 20, which increases from the first end 48A as far as the second end 48B. The rail 48 is therefore delimited laterally by two tilted lateral walls. Thus, the rail 48 has, as seen from the front, a general trapezoidal shape.

Also, the housing 50 extends in the vertical direction from a lower mouth 50A, at which the first end 48A of the rail is intended to be inserted, as far as an upper end 50B. The housing 50 has a width, in the transverse direction, which decreases from the lower mouth 50A as far as the upper end 50B. The housing 50 is therefore laterally delimited by two tilted lateral walls. The housing 50 thus has, as seen from the front, a general trapezium shape.

These trapezium shapes have several advantages. In particular, the width of the rail 48 at its first end 48A being smaller than the width of the housing 50 at its lower mouth 50A, the insertion of the rail 48 into the housing 50 is facilitated. The rail 48 may notably be inserted into the housing 50 without following a purely vertical trajectory, but by following a curve trajectory, corresponding to the tilting of the leg 24 mentioned earlier.

The rail 48 is shown partly inserted into the housing 50 in FIG. 7.

The travel of the rail 48 in the housing 50 is limited by the cooperation of the tilted walls of the rail 48 with the tilted walls of the housing 50, which are in contact at the end of travel of the rail 48 in the housing 50. These tilted walls in contact also give the possibility of partly supporting the weight of the table 12.

The rail 48 and the housing 50 are assembled at the end of travel of the rail 48 in this housing 50, as this is illustrated in FIG. 8.

In order to maintain the attachment member 52 and the lateral fixed support 46 in this assembled configuration, the comfort device 10 includes retractable means 54 for blocking the attachment member 52 on the lateral fixed support 46.

These retractable blocking means 54 are active when the attachment member 52 is added onto the lateral fixed support 46 at the end of the travel of the rail 48 in the housing 50.

These blocking means 54 are movable between a blocking position, wherein the rail 48 and the housing 50 are secured with each other, and a release position wherein the rail 48 and the housing 50 are free to move relatively to each other.

Figure 9:
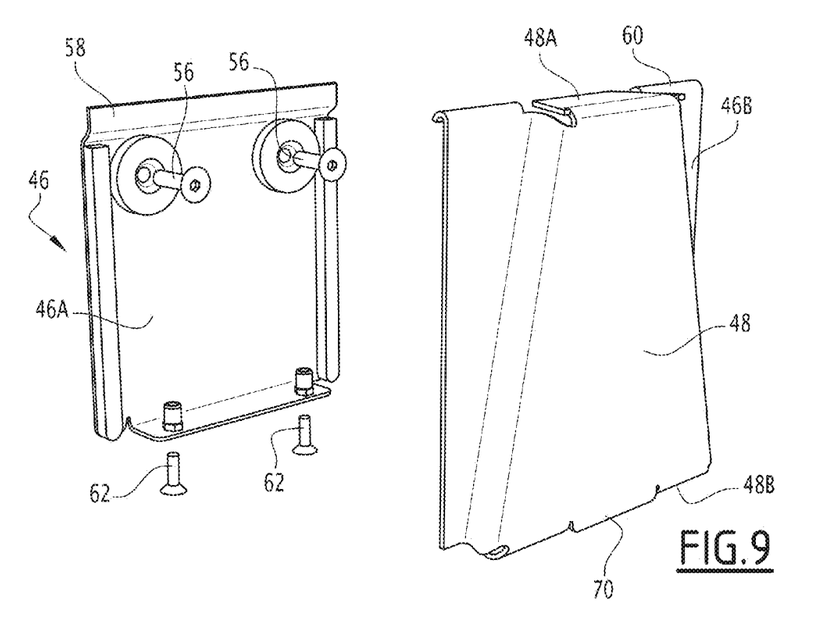
FIG. 9 is an exploded perspective view of the lateral fixed support according to an alternative embodiment.
Figure 10:
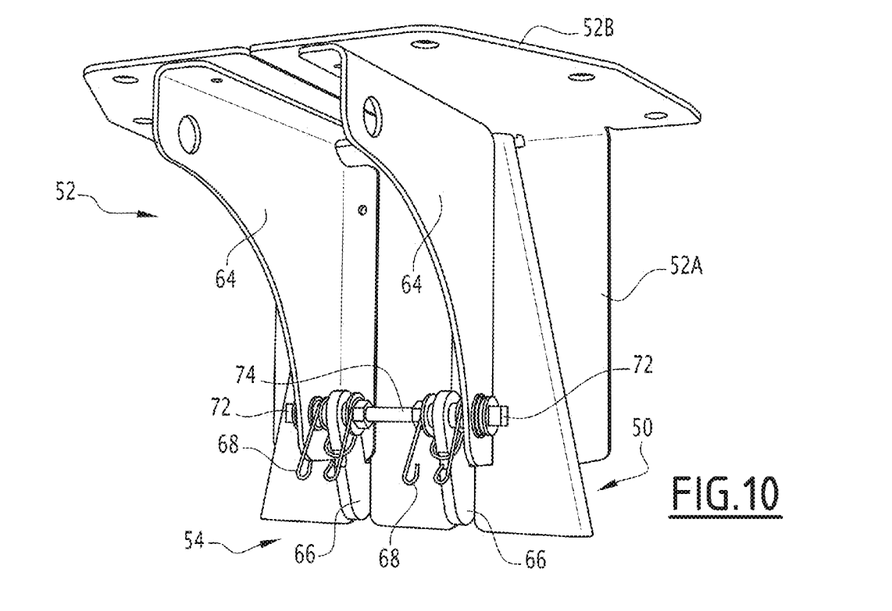
FIG. 10 is a perspective view of the attachment member according to a first alternative embodiment.

Examples of blocking means 54 are described in more detail in FIGS. 9 and 10, which respectively illustrate an example of a lateral fixed support 46 and an example of an attachment member 52.

According to this exemplary embodiment, the lateral fixed support 46 includes an inner panel 46A, intended to be attached to the lateral wall 20 of the compartment by means of conventional attachment means, for example by means of screws 56, and a second outer panel 46B, intended to be added onto the inner panel 46A, and bearing the rail 48. For this purpose, the inner panel 46A includes an upper fitting shape 58, for example formed by an upper ruler secured to the remainder of the inner panel 46A, and the second outer panel 46B includes an upper fitting curved portion 60 intended to rest on the ruler 58.

The attachment of the inner panel 46A with the second outer panel 46B is finalized by conventional lower attachment means 62, for example screws.

Alternatively, the lateral fixed support 46 is made in a single portion, in which case the attachments 56 are apparent, as this is the case for the example of FIGS. 5 to 8.

The attachment member 52 of the example of FIG. 10 includes a first vertical panel 52A, bearing the housing 50, and a second horizontal panel 52B intended to be attached to the plate 22 of the table 12. For this purpose, the second horizontal panel 52B is provided with orifices for letting through attachment elements such as screws.

Advantageously, the attachment member 52 includes reinforcement gussets 64, connecting the first vertical panel 52A to the second horizontal panel 52B.

The blocking means 54 include at least one male element 66 borne by the attachment member 52, movable between a deployed position and a retracted position, and, at least one first elastic member 68 for returning the male element 66 to its deployed position.

The blocking means 54 moreover include at least one fixed female element 70, mating the male element 66, borne by the lateral fixed support 46, each male element 66 being found facing the corresponding female element 70 when the attachment member 52 is added on the lateral fixed support 46 at the end of the travel of the rail 48 relatively to the housing 50. In the example illustrated in FIG. 9, the lateral fixed support 46 bears a single female element 70 common to two male elements 66, but it may alternatively include a female element for each male element.

As long as the rail 48 and the housing 50 cooperate with each other without being at the end of their travel, the male element 66 cooperates with the lateral fixed support 46, notably with the rail 48, in order to be pushed towards its retracted position. Thus, as long as the rail 48 and the housing 50 cooperate with each other, the male element 66 can only be deployed when it is facing the corresponding female element 70.

Moreover, the blocking means 54 include means 72 for displacing the male element 66 towards its retracted position, which may be actuated by an operator, for example by means of an added element such as a key, for example a key with a square section.

In the example described in FIG. 10, each male element 66 is formed by a hook borne by a rotating axis 74. This rotating axis 74 is borne by reinforcement gussets 64. The rotating axis 74 includes, at at least one of its ends, an actuation shape forming the displacement means 72.

Preferably, the rotating axis 74 has such an actuation shape at each of its ends, in order to be able to be equally actuated on one side or on the other, depending on the preference of the operator.

In the example described in FIG. 9, the female element 70 is formed by a hooking-up portion made at the lower end 48B of the rail 48. Alternatively, each female portion 70 is formed by an orifice made in the rail 48, facing the corresponding hook 66.

According to another alternative not shown, the male element is formed by a bolt which may be moved horizontally. The corresponding female element is then formed by a mating orifice.

Figure 11:
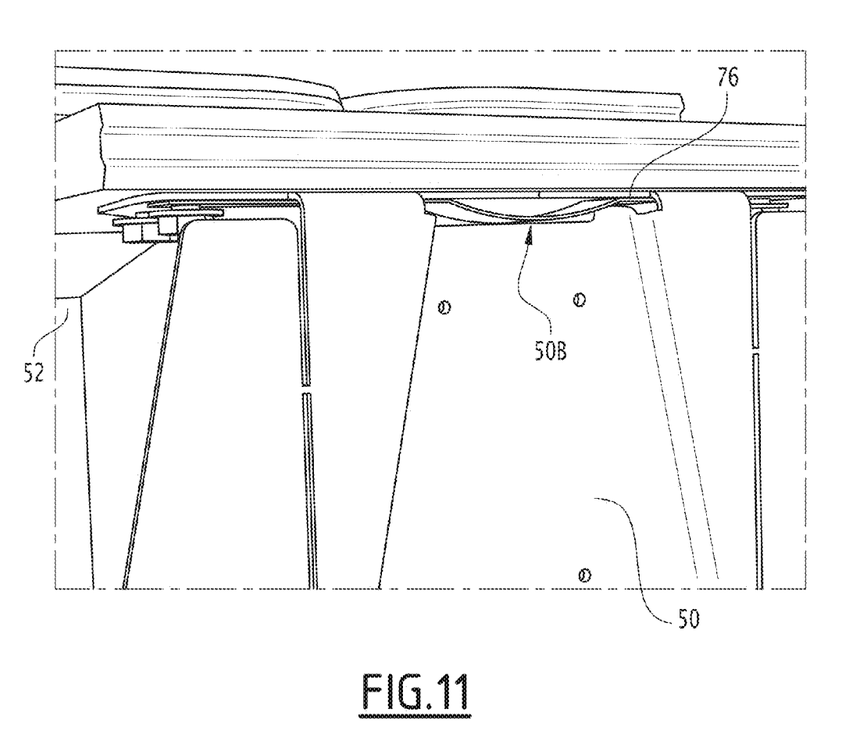
FIG. 11 is a perspective view of the attachment member of FIG. 10, showing detail of this attachment member.

Advantageously, as this is illustrated in FIG. 11, the attachment member 52 bears a second elastic member 76, intended to be laid out between this attachment member 52 and the lateral fixed support 46, in order to apply a separating force between this attachment member 52 and the lateral fixed support 46 in the vertical direction.

This second elastic member 76 is for example formed by an elastic blade borne at the upper end 50B of the housing 50, and intended to bear upon the first end 48A of the rail 48, which forms an edge as this is visible in FIG. 9.

Thus, when the attachment member 52 is assembled to the lateral fixed support 46, and that the blocking means 54 are deactivated by actuation of the displacement means 72, the attachment member 52 moves upward along the rail 48 under the effect of the separating force exerted by the second elastic member 76, so that the male elements 66 are no longer facing the corresponding female element 70. The blocking means 54 are thereby deactivated. However the table 12 remains in place, the rail 48 and the housing 50 remaining held together by their dovetail shape.

The stiffness of the second elastic member 76 is selected so as to withstand the weight of the table, the separation force having to be greater than this weight, so that only a thrust action from the operator downwards allows engagement of each male element 66 into the corresponding female element 70.

The mounting and the dismantling of the comfort device 10 according to the invention will now be described.

In order to mount the comfort device 10, the table leg 24 is first of all provided, tilted, on the fixed support on the floor 26, by inserting the abutment 40 under the edge 34, as this is illustrated in FIG. 2.

The table 12 is then tilted so as to vertically straighten the table leg 24 as this is illustrated in FIG. 3.

During this tilting, the attachment member 52, borne by the table 12, will cooperate with the lateral fixed support 46, the rail 48 of which will engage into the housing 50. Because of the trapezium shapes of the rail 48 and of the housing 50, the latter will easily cooperate with each other in spite of the fact that the docking is accomplished during the tilting of the table 12, and not during a purely vertical displacement.

When the rail 48 arrives at the end of travel in the housing 50, a thrust force has to be exerted on the table in order to overcome the separation force exerted by the second elastic member 76, until each male element 66 is engaged into the corresponding female element 70.

The attachment member 52 is then blocked on the lateral fixed support 46, both vertically by the blocking means 54, perpendicularly to the lateral wall 20 because of the dovetail shape of the rail 48 and of the housing 50, and transversely because of the side walls of the rail which cooperate with the side walls of the housing 50.

In order to dismantle the table, it is necessary to actuate the means 72 for displacing the male elements 66, in order to move them into their retracted position and thus disengaging them from the corresponding female element 70.

The attachment member 52 is then no longer blocked vertically, and the latter is driven upwards under the effect of the second elastic member 76. The male elements 66 are then no longer facing the corresponding female elements 70, so that the blocking means 54 are deactivated.

Thus, these blocking means 54 are deactivated without requiring that the displacement means 72 be held, so that the operator thus has both hands free for then maneuvering the table 12.

It should be noted that the vertical displacement of the attachment member 52 for deactivating the blocking means is possible by means of the play defined between the abutment 40 and the edge 34, as well as preferably by the flexibility of the connection between the leg 24 and the plate 22.

The table 12 is then tilted, in a movement opposite to the one having been performed during the mounting of the table, in order to release the leg 24 of the fixed support on the floor 26.

The table may thus be transported, in order to be mounted on other attachment supports provided in the compartment.

Figure 12:
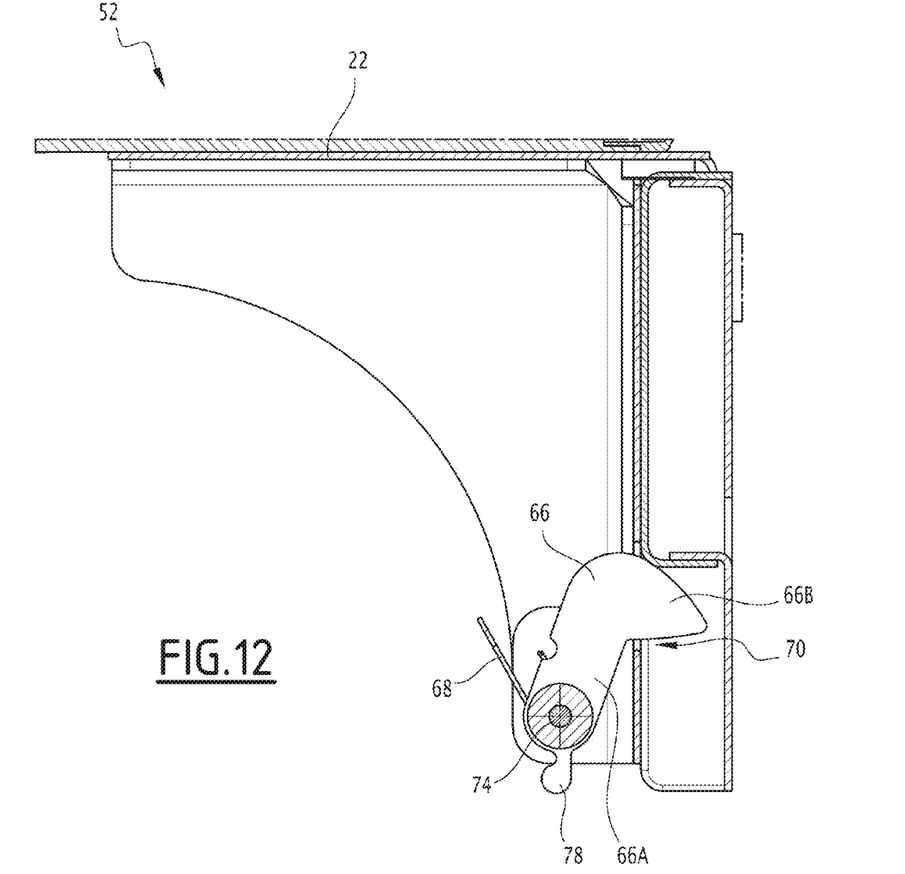
FIG. 12 is a sectional view of the attachment member according to a second alternative embodiment.

In FIG. 12 the attachment member 52 is illustrated according to another alternative embodiment. In this FIG. 12, the elements similar to those of the preceding figures are designated with identical references.

According to this alternative embodiment, the male elements 66 are hook-shaped extending above their rotating axis 74 in the vertical direction (therefore towards the shelf). Each male element 66 includes an elongated body 66A connected to the rotating axis 74, and an extension 66B extending and protruding from the body 66A, the extension 66B being intended to be inserted into the corresponding female element 70.

The body 66A is tilted with respect to the vertical direction, towards the female element 70.

Thus, because the male element 66 extends above the rotating axis, and that the body 66A is tilted towards the female element 70, in the case of a tensile force upwards applied to the table 12, the male element 66, cooperating with the female element 70, is subject to a rotation torque around the axis 74, towards the female element 70, which has the effect of reinforcing the locking. The safety of the locking is therefore reinforced in this alternative.

Optionally, the male element 66 is provided with a lever 78 secured to the body 66A, extending below the axis 74. This lever 78 forms secondary displacement means, which may be activated for example if the displacement means 72 are deteriorated.

It will be noted that the invention is not limited to the embodiment described earlier, but may have diverse other alternatives.

For example, other blocking mean structures 54 may be contemplated.

According to another alternative, the table is without any leg, and only includes a plate 22.

The invention claimed is:

1. A comfort device, including a table comprising a plate and attachment elements for attaching the table to a structural portion of a compartment, wherein the attachment elements include:
   a lateral fixed support, intended to be attached to a vertical wall of the structural portion of the compartment, comprising a first connecting portion,
   an attachment member secured to the plate of the table, comprising a second connecting portion, mating the first connecting portion,
   retractable blocking elements for blocking the attachment member on the lateral fixed support, the retractable blocking elements being active when the attachment member is added onto the lateral fixed support at the end of a predefined travel from the first connecting portion relatively to the second connecting portion, the retractable blocking elements being movable between a blocking position in which the first connecting portion and the second connecting portion are secured to each other, and a release position in which the first connecting portion and the second connecting portion are free to move relatively to each other,
   and in that one of the first connecting portion and the second connecting portion is formed by a rail, extending in a vertical direction, having a trapezoidal section in a horizontal plane, and the other one of the first connecting portion and second connecting portion is formed by an elongated housing mating said rail, wherein the rail may slide in the vertical direction,
   wherein the table comprises a central leg secured to the plate, the attachment elements including a fixed support on the floor, intended to be attached to a floor wall of the structural portion of the compartment, intended to be connected to the central leg of the table, and comprising a maintaining element for maintaining this central leg, and wherein the fixed support on the floor includes a vertically protruding shape, having a peripheral edge comprising an upper rim extending from a portion of the peripheral edge, and the table leg includes a hollow lower area having an inner edge with a shape mating that of the peripheral edge, and having an inner abutment extending inwards, said inner abutment being intended to be inserted under the upper rim, this inner abutment being thus intended to cooperate with the upper rim for limiting vertical displacement upwards of the table leg.

2. The comfort device according to claim 1, wherein the upper rim extends horizontally from the peripheral edge by moving away from the lateral fixed support.

3. The comfort device according to claim 1, wherein the blocking elements include:

at least one male element borne by one from among the attachment member and the lateral fixed support, movable between a deployed position and a retracted position, and at least one first elastic member for returning the male element towards the deployed position, at least one fixed female element, mating the male element, borne by the other one from among the attachment member and the lateral fixed support, each male element being found facing the corresponding female element when the attachment member is added onto the lateral fixed support at the end of the predefined travel of the first connecting portion with respect to the second connecting portion.

4. The comfort device according to claim 3, wherein the male element is able to cooperate with said other one from among the attachment member and the lateral fixed support, in order to be pushed towards its retracted position as long as the first connecting portion and second connecting portion cooperate with each other without being at the end of their travel.

5. The comfort device according to claim 3, including a displacement member for displacing the male element towards the retracted position, which may be actuated by an operator.

6. The comfort device according to claim 3, wherein each male element extends above a rotating axis in a vertical direction, and includes an elongated body connected to the rotating axis, and an extension extending and protruding therefrom and from the body, the extension being intended to cooperate with the corresponding female element, and the body being tilted with respect to the vertical direction, towards the female element.

7. The comfort device according to claim 1, wherein:

the rail extends in the vertical direction between a first end, intended to be presented first upon inserting the rail into the housing, as far as a second end, and has a width, in a transverse direction perpendicular to the vertical direction, which increases from the first end as far as the second end, and the housing extends in the vertical direction from a lower mouth, and has a width, in the transverse direction, which decreases from this lower mouth.

8. A comfort device, including a table comprising a plate and attachment elements for attaching the table to a structural portion of a compartment, wherein the attachment elements include:

a lateral fixed support, intended to be attached to a vertical wall of the structural portion of the compartment, comprising a first connecting portion, an attachment member secured to the plate of the table, comprising a second connecting portion, mating the first connecting portion, retractable blocking elements for blocking the attachment member on the lateral fixed support, the retractable blocking elements being active when the attachment member is added onto the lateral fixed support at the end of a predefined travel from the first connecting portion relatively to the second connecting portion, these retractable blocking elements being movable between a blocking position in which the first connecting portion and the second connecting portion are secured to each other, and a release position in which the first connecting portion and the second connecting portion are free to move relatively to each other, and in that one of the first connecting portion and the second connecting portion is formed by a rail, extending in a vertical direction, having a trapezoidal section in a horizontal plane, and the other one of the first connecting portion and second connecting portion is formed by an elongated housing mating said rail, wherein the rail may slide in the vertical direction, wherein the blocking elements include:

at least one male element borne by one from among the attachment member and the lateral fixed support, movable between a deployed position and a retracted position, and at least one first elastic member for returning the male element towards the deployed position, at least one fixed female element, mating the male element, borne by the other one from among the attachment member and the lateral fixed support, each male element being found facing the corresponding female element when the attachment member is added onto the lateral fixed support at the end of the predefined travel of the first connecting portion with respect to the second connecting portion, and wherein each male element is formed by a hook borne by a rotating axis.

9. The comfort device according to claim 8, wherein:

the rail extends in the vertical direction between a first end, intended to be presented first upon inserting the rail into the housing, as far as a second end, and has a width, in a transverse direction perpendicular to the vertical direction, which increases from the first end as far as the second end, and the housing extends in the vertical direction from a lower mouth, and has a width, in the transverse direction, which decreases from this lower mouth.

10. The comfort device according to claim 8, wherein the table comprises a central leg secured to the plate, the attachment elements including a fixed support on the floor, intended to be attached to a floor wall of the structural portion of the compartment, intended to be connected to the central leg of the table, and comprising a maintaining element for maintaining this central leg.

11. The comfort device according to claim 8, wherein the male element is configured to cooperate with said other one from among the attachment member and the lateral fixed support, in order to be pushed towards the retracted position as long as the first connecting portion and second connecting portion cooperate with each other without being at the end of their travel.

12. The comfort device according to claim 8, including a displacement member for displacing the male element towards its retracted position, which may be actuated by an operator.

13. The comfort device according to claim 8, wherein each male element extends above the rotating axis in a vertical direction, and includes an elongated body connected to the rotating axis, and an extension extending and protruding therefrom and from the body, the extension being intended to cooperate with the corresponding female element, and the body being tilted with respect to the vertical direction, towards the female element.

14. A comfort device, including a table comprising a plate and attachment elements for attaching the table to a structural portion of a compartment, wherein the attachment elements include:
- a lateral fixed support, intended to be attached to a vertical wall of the structural portion of the compartment, comprising a first connecting portion,
- an attachment member secured to the plate of the table, comprising a second connecting portion, mating the first connecting portion,
- retractable blocking elements for blocking the attachment member on the lateral fixed support, the retractable blocking elements being active when the attachment member is added onto the lateral fixed support at the end of a predefined travel from the first connecting portion relatively to the second connecting portion, the retractable blocking elements being movable between a blocking position in which the first connecting portion and the second connecting portion are secured to each other, and a release position in which the first connecting portion and the second connecting portion are free to move relatively to each other,
- and in that one of the first connecting portion and the second connecting portion is formed by a rail, extending in a vertical direction, having a trapezoidal section in a horizontal plane, and the other one of the first connecting portion and second connecting portion is formed by an elongated housing mating said rail, wherein the rail may slide in the vertical direction, wherein the blocking elements include:
- at least one male element borne by one from among the attachment member and the lateral fixed support, movable between a deployed position and a retracted position, and at least one first elastic member for returning the male element towards the deployed position,
- at least one fixed female element, mating the male element, borne by the other one from among the attachment member and the lateral fixed support, each male element being found facing the corresponding female element when the attachment member is added onto the lateral fixed support at the end of the predefined travel of the first connecting portion with respect to the second connecting portion, wherein the comfort device includes a second elastic member laid out between the attachment member and the lateral fixed support, applying a separation force between the attachment member and the lateral fixed support in the vertical direction.

15. The comfort device according to claim 14, wherein:
- the rail extends in the vertical direction between a first end, intended to be presented first upon inserting the rail into the housing, as far as a second end, and has a width, in a transverse direction perpendicular to the vertical direction, which increases from the first end as far as the second end, and
- the housing extends in the vertical direction from a lower mouth, and has a width, in the transverse direction, which decreases from this lower mouth.

16. The comfort device according to claim 14, wherein the table comprises a central leg secured to the plate, the attachment elements including a fixed support on the floor, intended to be attached to a floor wall of the structural portion of the compartment, intended to be connected to the central leg of the table, and comprising a maintaining element for maintaining this central leg.

17. The comfort device according to claim 14, wherein the male element is able to cooperate with said other one from among the attachment member and the lateral fixed support, in order to be pushed towards the retracted position as long as the first connecting portion and second connecting portion cooperate with each other without being at the end of their travel.

18. The comfort device according to claim 14, including a displacement member for displacing the male element towards the retracted position, which may be actuated by an operator.

19. The comfort device according to claim 14, wherein each male element extends above a rotating axis in a vertical direction, and includes an elongated body connected to the rotating axis, and an extension extending and protruding therefrom and from the body, the extension being intended to cooperate with the corresponding female element, and the body being tilted with respect to the vertical direction, towards the female element.

* * * * *